US011722237B2

(12) United States Patent
Seyedi

(10) Patent No.: US 11,722,237 B2
(45) Date of Patent: Aug. 8, 2023

(54) OPTICAL PASS-THROUGH LINK TRAINING

(71) Applicant: HEWLETT PACKARD ENTERPRISE DEVELOPMENT LP, Houston, TX (US)

(72) Inventor: Mir Ashkan Seyedi, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/495,789

(22) Filed: Oct. 6, 2021

(65) Prior Publication Data

US 2023/0106030 A1 Apr. 6, 2023

(51) Int. Cl.

| H04J 14/02 | (2006.01) |
| H04B 10/50 | (2013.01) |
| H04B 10/60 | (2013.01) |
| H04B 10/25 | (2013.01) |
| G02B 6/293 | (2006.01) |
| G02B 6/12  | (2006.01) |

(52) U.S. Cl.
CPC .......... H04J 14/0227 (2013.01); H04B 10/25 (2013.01); H04B 10/50 (2013.01); H04B 10/60 (2013.01); G02B 6/12007 (2013.01); G02B 6/2938 (2013.01); G02B 6/29338 (2013.01); G02B 6/29395 (2013.01)

(58) Field of Classification Search
CPC ............. H04J 14/0227; G02B 6/12007; G02B 6/29338; G02B 6/2938; G02B 6/29395; H04B 10/25; H04B 10/50; H04B 10/60
USPC ......................................................... 398/208
See application file for complete search history.

(56) References Cited

U.S. PATENT DOCUMENTS

| 9,948,389 | B2 * | 4/2018 | D'Errico | H04J 14/0212 |
| 10,432,315 | B2 * | 10/2019 | Chen | H04B 10/801 |
| 11,057,143 | B1 * | 7/2021 | Van Vaerenbergh | G11C 15/00 |
| 2003/0223682 | A1 * | 12/2003 | Kinoshita | H04J 14/0295 |
| | | | | 385/24 |
| 2005/0265721 | A1 * | 12/2005 | Pigeon | H04J 14/0227 |
| | | | | 398/85 |

(Continued)

FOREIGN PATENT DOCUMENTS

WO     WO-2011108617 A1 *  9/2011  ......... G02B 6/12007

*Primary Examiner* — Abbas H Alagheband
(74) *Attorney, Agent, or Firm* — Sheppard Mullin Richter & Hampton LLP

(57) ABSTRACT

Systems, methods, and computer-readable media are described for performing link training to enable optical pass-through (OPT) capabilities of a network node. OPT capabilities may refer to on-chip wavelength routing for a multi-wavelength data input, whereby an intermediate node detects wavelengths that are intended for OPT and transparently passes the wavelengths through to downstream nodes. When executed at an intermediate network node, an OPT link training algorithm can result in the creation of one or more wavelength routing maps that associate wavelengths received on particular inputs to the node with particular outputs of the node. An intermediate node may generate a respective wavelength routing map for each transmit node from which it receives input data. The wavelength routing maps may together implement OPT capabilities at the intermediate node as each wavelength routing map may indicate the manner in which wavelengths are passed through the intermediate node for a given transmit node.

15 Claims, 8 Drawing Sheets

(56) References Cited

U.S. PATENT DOCUMENTS

| | | | |
|---|---|---|---|
| 2006/0067696 A1* | 3/2006 | Kai | H04J 14/0238 398/85 |
| 2009/0220228 A1* | 9/2009 | Popovic | G02B 6/29343 398/48 |
| 2012/0251042 A1* | 10/2012 | Julien | G02B 6/12019 385/17 |
| 2017/0170895 A1* | 6/2017 | D'Errico | H04J 14/0212 |
| 2018/0212682 A1* | 7/2018 | Chen | H04B 10/50572 |

* cited by examiner

OPTICAL PASS-THROUGH LINK TRAINING

STATEMENT OF GOVERNMENT RIGHTS

This invention was made with Government support under Agreement Number H98230-19-3-0002. The Government has certain rights in the invention.

BACKGROUND

An optical ring resonator is a collection of waveguides, where at least one waveguide is a closed loop coupled to a coupling mechanism. The coupling mechanism allows light to be introduced to the closed loop and to exit from the closed loop. The coupling mechanism may itself be a waveguide, sometimes referred to as a bus waveguide. An optical ring resonator may be tuned to a resonance wavelength. When light having the resonance wavelength is introduced to the closed loop from an input bus waveguide coupled to the closed loop, the light builds in intensity over the course of multiple round trips due to constructive interference, and is ultimately outputted to an output bus waveguide. Because only a select number of one or more wavelengths are at resonance within the loop, the optical ring resonator can function as a filter.

BRIEF DESCRIPTION OF THE DRAWINGS

The present disclosure, in accordance with one or more various embodiments, is described in detail with reference to the following figures. The FIGS. are provided for purposes of illustration only and merely depict typical or example embodiments.

Figure 1:
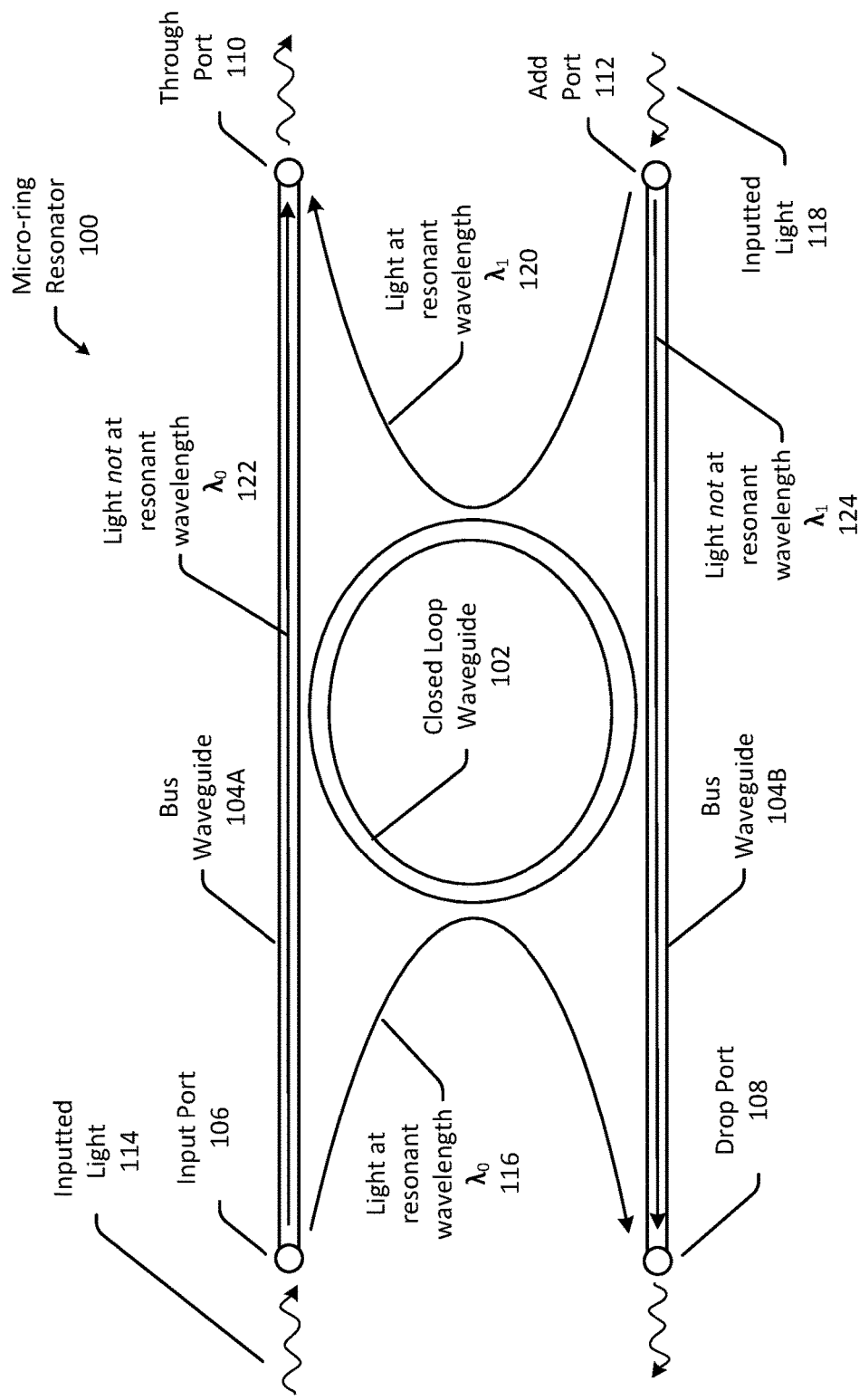
FIG. 1 is a schematic diagram of a micro-ring optical resonator configurable to provide optical pass-through (OPT) capabilities according to example embodiments of the disclosed technology.

The figures are not exhaustive and do not limit the present disclosure to the precise form disclosed.

DETAILED DESCRIPTION

Embodiments of the disclosed technology relate to, among other things, systems, methods, algorithms, computer-readable media, and the like for performing link training to enable optical pass-through (OPT) capabilities of a network node. OPT capabilities may refer to on-chip wavelength routing for a multi-wavelength data input, whereby an intermediate node detects wavelengths that are intended for OPT and transparently passes the wavelengths through to downstream nodes. In this context, transparent may mean that no optical buffering, electro-optical conversion, electrical buffering, or optical amplification is performed on a passed-through wavelength. When executed at an intermediate network node, an OPT link training algorithm according to example embodiments of the disclosed technology can result in the creation of one or more wavelength routing maps that associate wavelengths received on particular inputs to the node with particular outputs of the node. In some embodiments, an intermediate node may generate a respective wavelength routing map for each transmit node from which it receives input data. The wavelength routing maps may together implement OPT capabilities at the intermediate node as each wavelength routing map may indicate the specific manner in which transmit wavelengths are passed through the intermediate node for a given transmit node.

In some embodiments, the link training algorithms disclosed herein may enable OPT capabilities for a dense wavelength division multiplexing (DWDM) optical interconnect architecture that includes one or more transmit banks, a filter bank, and one or more receive banks. In a network topology that includes multiple interconnected nodes implementing a DWDM optical interconnect architecture, each node may include, for example, a transmit bank, a filter bank, and a receive bank. The filter bank of a given node may have multiple optical fiber inputs from the transmit banks of multiple other nodes, respectively. Similarly, the filter bank of a given node may have multiple optical fiber outputs to the receive banks of multiple other nodes, respectively. At times herein, the terms bank and node may be used interchangeably.

A transmit bank may include multiple transmit optical ring modulators, each of which may be tuned to a respective wavelength of the electromagnetic spectrum. For instance, a transmit bank may include N ring modulators for N different wavelengths. A filter bank may, in turn, include N optical ring filters, each of which may be sensitive to a respective one of the N wavelengths (referred to as a resonance wavelength of the optical ring filter). In particular, each ring filter may be configured to route optical signals at a respective resonance wavelength of the ring filter to a predetermined optical fiber output of the filter bank. Each fiber output of the filter bank is, in turn, connected to a corresponding receive bank that itself includes multiple ring filters and corresponding drop port photodetectors. In particular, an optical signal with a wavelength that matches a resonance wavelength of a particular ring filter of the filter bank is routed to an output port of the filter bank that corresponds to that particular ring filter and is ultimately directed to a particular receive node connected to that output port. The wavelength of the optical signal may, in turn, match the resonance wavelength of one of the ring filters in the receive bank, in which case, the signal may be routed to a drop port of that ring filter and detected by a corresponding photodetector. The photodetector may convert the optical signal to an electrical signal.

A resonance wavelength of an optical ring filter may be tunable. That is, an optical ring filter may be tunable to different resonance wavelengths depending on which wavelength is desired to be filtered. For instance, a thermal resonance wavelength controller—which may be integrated with an optical ring filter—may enable tuning the ring filter's resonance wavelength to any wavelength within a given range of the electromagnetic spectrum. More particularly, and as will be described in more detail later in this disclosure, in some embodiments of the disclosed technology, a voltage sweep of a thermal resonance wavelength controller may be performed, which may result in various wavelengths being detected at corresponding bias voltages for the controller. Setting the thermal resonance wavelength controller to a particular bias voltage may thus tune the optical ring filter to a corresponding resonance wavelength. While a node within a network topology organized according to a DWDM optical interconnect architecture has been described as including a single transmit bank and a single receive bank, it should be appreciated that a node may include multiple transmit banks and multiple receive banks, and potentially, a different number of transmit banks as compared to receive banks. Still further, while a filter bank, or more specifically, an optical ring filter of a filter bank may be described herein at times as routing/ directing a specific wavelength (i.e., a resonance wavelength of the ring filter) to a particular output port/receive bank, it should be appreciated that it is in fact an optical signal having that specific wavelength that is being routed/directed.

As noted, each optical ring filter of a filter bank may route optical signals at a respective resonance wavelength to which it is tuned to a particular output port of the filter bank, and further, to a corresponding particular receive bank connected to that particular output port. These physical connections between ring filter, output fiber, and receive bank may be predetermined based on system design. However, while the physical connections may be determined based on system design, which wavelengths are routed by which ring filters in the filter bank can vary for different transmit banks.

For example, different transmit nodes may wish to direct a given wavelength to different destination endpoints (i.e., different receive nodes). Assume transmit node A wishes to direct wavelength Al to receive node A, while transmit node B wishes to direct the same wavelength Al to a different receive node (e.g., receive node B). In order to accommodate this, a filter bank of an intermediate node that sits between transmit nodes A and B and the desired destination/receive nodes needs to map optical signals received from transmit node A at wavelength Al to the optical ring filter connected to an output fiber that leads to receive node A, and needs to map optical signals received from transmit node B at wavelength Al to a different optical ring filter (i.e., a ring filter connected to an output fiber that leads to receive node B). The intermediate filter node may achieve this by tuning its optical ring filters to different resonance wavelengths depending on which transmit node the optical signals are received from.

Because different transmit nodes may wish to route a given wavelength to different receive nodes, an intermediate filter node maintains a respective one-to-one mapping between transmit wavelengths and optical ring filters for each transmit node. As noted, these mappings may be different for different transmit nodes. Generating the one-to-one mappings (also referred to herein as wavelength routing maps) that identify, for each transmit node, which transmit wavelength is routed to which ring filter (and associated photodetector) in a filter node, and ultimately to which receive node, presents a technical problem because although ring filters are wavelength-sensitive, they do not inherently detect the actual value (i.e., color) of the wavelength itself. Rather, an on-chip photodetector associated with a ring filter simply detects the presence or absence of light.

Embodiments of the disclosed technology solve this technical problem by providing OPT link training systems, methods, algorithms, and the like that are capable of generating the wavelength routing maps that synchronize transmit ring modulators with the appropriate intermediate ring filters to ensure that transmit wavelengths are routed to their intended receive nodes despite the ring filters being agnostic to the actual wavelength values. As such, embodiments of the disclosed technology provide a technical solution that enables a collection of nodes organized according to a DWDM optical interconnect architecture to dynamically redefine a network topology of the nodes without having to modify any physical optical fiber connections between nodes. In particular, dynamic redefinition of the network topology can be achieved by executing the OPT training algorithms disclosed herein to modify wavelength routing maps that determine how signals of different wavelengths are routed between nodes. In this manner, the OPT capabilities of intermediate nodes can be leveraged to establish virtual connections between nodes that not connected via physical fiber connections. Accordingly, embodiments of the disclosed technology provide an improvement to the technological field of photonics and to the functioning of a computer, and in particular, an improvement to the functioning of a network of computing nodes arranged according to a DWDM optical interconnect architecture.

Referring now to FIG. 1, a micro-ring resonator 100 is depicted. The ring resonator 100 is an example type of optical ring filter. The ring resonator 100 may include a collection of waveguides including bus waveguides 104A, 104B and a closed loop (circular) waveguide 102. The ring resonator 100 may further include multiple ports including an input port 106, a drop port 108, a through port 110, and an add port 112. While a single closed loop waveguide 102 is depicted, it should be appreciated that the ring resonator 100 may include multiple closed loop resonators. Further, while bus waveguides 104A, 104B are depicted as the coupling mechanisms for coupling light entering the resonator 100 to the closed loop waveguide 102, it should be appreciated that other coupling mechanisms may be employed.

In operation, input light 114 may enter the ring resonator 100 at the input port 106. As noted, the micro-ring resonator 100 is a type of optical ring filter, and thus, can be tuned to a resonance wavelength such that input light 114 that is at the resonance wavelength enters the closed loop waveguide 102 from the bus waveguide 104A by virtue of the coupling there between. Assume, for instance, that the ring resonator 100 is tuned to a resonance wavelength $\lambda_0$, then light 116 entering the input port 106 and having wavelength $\lambda_0$ is routed from the bus waveguide 104A, through the closed loop waveguide 102, to the bus waveguide 104B, and ultimately to the drop port 108. In contrast, input light 122 that is not at the resonance wavelength $\lambda_0$ may not be picked up by the closed loop waveguide 102 and may instead continue along the bus waveguide 104A to the through port 110.

In some embodiments, the micro-ring resonator 100 may be tuned to multiple resonance wavelengths. For example, the resonator 100 may also be tuned to a resonance wavelength $\lambda_1$ such that the portion 120 of the light 118 inputted at the add port 112 that is at the resonance wavelength $\lambda_1$ may be routed to the through port 110. On the other hand, that portion 124 of the input light 118 that is not at the resonance wavelength $\lambda_1$ may not be picked up by the closed loop waveguide 102 (or by another closed loop waveguide that forms part of the resonator 100 and is tuned to the resonance wavelength $\lambda_1$), and may continue along the bus waveguide 104B to the drop port 108. In this manner, the micro-ring resonator 100 is capable of performing wavelength-sensitive routing of optical signals.

It should be appreciated that the structure of the microring resonator 100 depicted in FIG. 1 is merely illustrative, and that optical ring filters described herein may have the structure of the resonator 100 or one or more alternative structures. For example, in some embodiments, the set of ring filters in a node may be implemented as a sequence of closed loop waveguides coupled to a pair of bus waveguides, where each closed loop waveguide is tuned to a respective resonance wavelength, and where light having a wavelength that matches the resonance wavelength of a particular closed loop waveguide is picked up by that waveguide and routed to a respective corresponding output port (e.g., drop port). For instance, in the case of the example resonance wavelengths $\lambda_0$ and $\lambda_1$, a first closed loop waveguide of a ring filter may be tuned to the resonance wavelength $\lambda_0$ and a second closed loop waveguide of the ring filter may be tuned to the resonance wavelength $\lambda_1$ such that a portion 116 of the light 114 injected into the input port 106 that is at resonance wavelength $\lambda_0$ is picked up by the first closed loop waveguide and routed to a corresponding first output port. Portions of the light 114 at other wavelengths continue to travel along the input bus waveguide, and when the light 114 reaches the second closed loop waveguide, that portion of the light at wavelength $\lambda_1$ is picked up by the second closed loop waveguide and routed to a second output port. Alternative implementations for the optical ring filters described herein are also contemplated.

Figure 2:
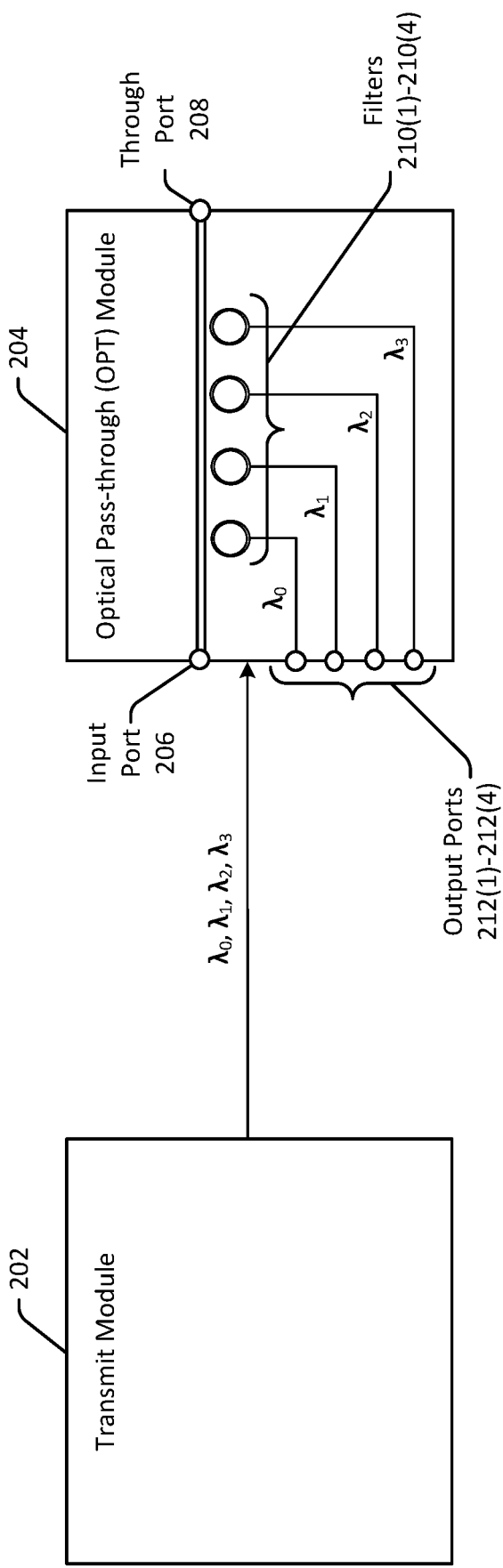
FIG. 2 schematically depicts an OPT module usable within a network topology to provide OPT capabilities according to example embodiments of the disclosed technology.

The OPT capabilities that may be implemented within a filter node using a collection of optical ring filters having the structure of the micro-ring resonator 100 of FIG. 1 (or variations thereof) will now be described in more detail in reference to FIG. 2. FIG. 2 schematically depicts an OPT module usable within a network topology to provide OPT capabilities according to example embodiments of the disclosed technology. Referring now to FIG. 2, a transmit module 202 and an OPT module 204 are shown. The transmit module 202 may be a transmit bank of a node within a network topology having a DWDM optical interconnect architecture. Although not shown in FIG. 2, the transmit module 202 may include multiple transmit modulators (i.e., transmit ring filters), each of which is configured to route optical signals at a respective wavelength to one or more output optical fibers of the transmit module 202 that, in turn, become one or more input fibers to the OPT module 204. For instance, the transmit module 202 may include 4 optical ring transmit modulators that transmit on wavelengths $\lambda_0$, $\lambda_1$, $\lambda_2$, and $\lambda_3$, respectively. For ease of explanation, it is assumed that these four wavelengths are routed to a single input optical fiber connected to input port 206 of the OPT module 204. It should be appreciated, however, that in other implementations the multiple wavelengths may be routed in any desired combination(s) to multiple input fibers of the OPT module 204.

In some embodiments, the OPT module 204 may form at least part of a filter bank of a node that is within a same network topology as a node containing the transmit module 202. In operation, the OPT module 204 may receive optical signals having wavelengths $\lambda_0$, $\lambda_1$, $\lambda_2$, and $\lambda_3$ at input port 206. Four distinct wavelengths are shown merely by way of example; more or less wavelengths may be received at the input port 206. As the received optical signals travel though the OPT module 204, such as along a bus waveguide of the OPT module 204, the signals will encounter various optical ring filters 210(1)-210(4).

Assume that a resonance wavelength of the filter 210(1) that is closest to the input port 206 is $\lambda_0$ and that the resonance wavelengths of the sequence of additional filters 210(2)-210(4) that follow the initial filter 210 are $\lambda_1$, $\lambda_2$, and $\lambda_3$, respectively. In such a scenario, optical signals having a wavelength $\lambda_0$ would be picked up by the filter 210(1) that is closest to the input port 206—by virtue of the resonance wavelength of the filter 210(1) being tuned to $\lambda_0$—and routed to a corresponding output port 212(1). Optical signals at other wavelengths, on the other hand, would continue past the initial filter 210(1). Then, those optical signals having a wavelength Al would be picked up by the next filter 210(2) in the sequence of filters and routed to a corresponding output port 212(2) that is distinct from the output port 212(1). In a similar fashion, optical signals at wavelengths over than $\lambda_0$ and $\lambda_1$ would continue past both ring filter 210(1) and ring filter 210(2), with optical signals at wavelength $\lambda_2$ being picked up by ring filter 210(3) and routed to output port 212(3) and optical signals at wavelength $\lambda_3$ being picked up by ring filter 210(4) and routed to output port 212(4). Any optical signals having wavelengths other than $\lambda_0$, $\lambda_1$, $\lambda_2$, or $\lambda_3$ would travel past all ring filters 210(1)-210(4) and would be routed to the through port 208.

Figure 3:
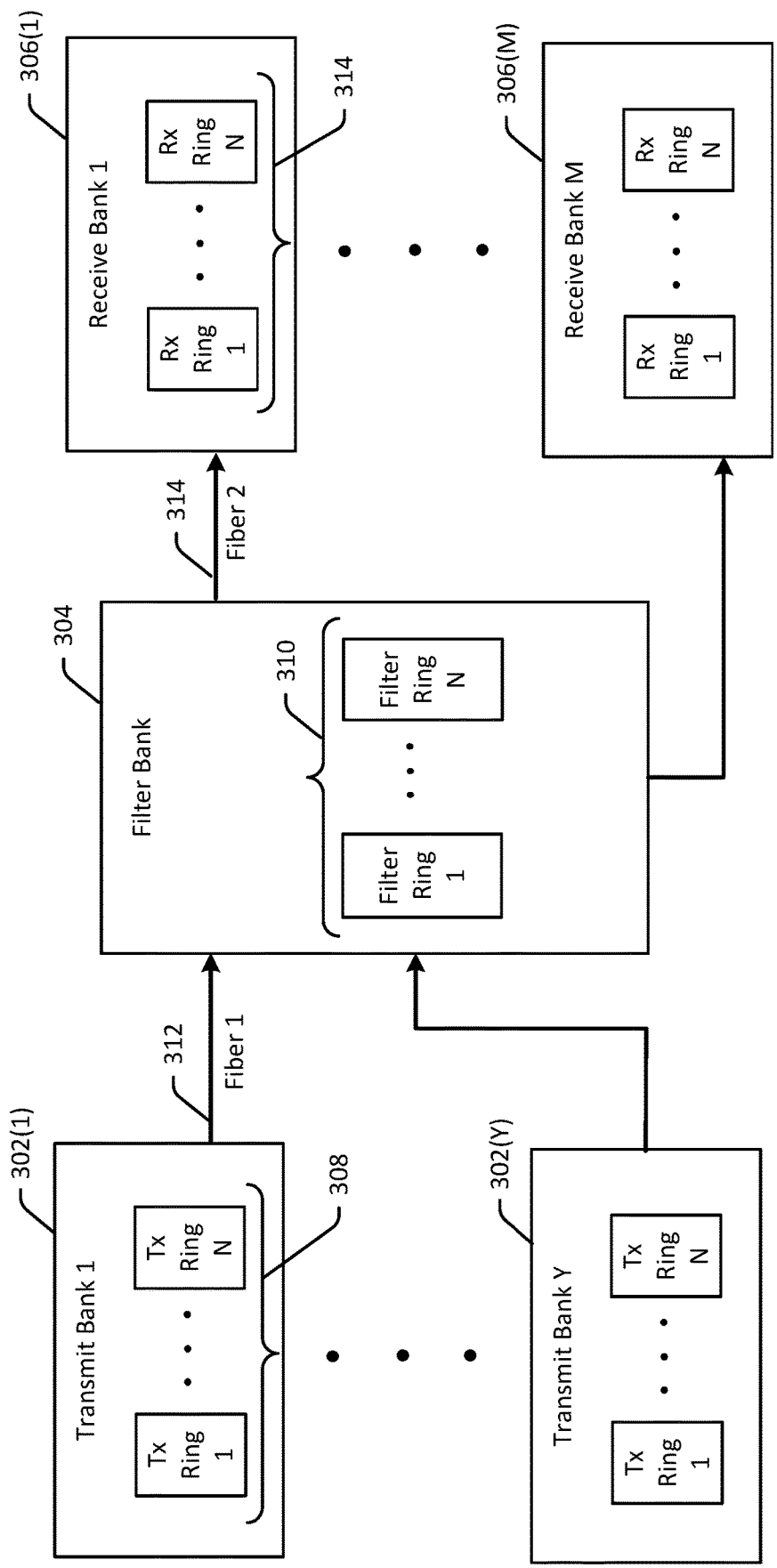
FIG. 3 is a schematic diagram of a dense wavelength division multiplexing (DWDM) optical interconnect architecture according to example embodiments of the disclosed technology.

FIG. 3 is a schematic diagram of a DWDM optical interconnect architecture according to example embodiments of the disclosed technology. One or more transmit banks 302(1)-302(Y) may be provided. In some embodiments, each transmit bank (referred to generically herein as transmit bank 302) may form part of a distinct node within a network topology of interconnected nodes. In other example embodiments, a node may include multiple transmit banks 302. Each transmit bank 302 may include multiple transmit ring modulators (e.g., optical ring filters), each of which is tuned to a respective one of N wavelengths. For instance, transmit bank 302(1) includes N optical ring modulators 308 corresponding to N different wavelengths.

Each transmit bank 302 may have one or more optical fiber connections to a filter bank 304. The filter bank 304 may form part of an intermediate node within a same network of interconnected nodes that includes the transmit nodes containing the transmit banks 302(1)-302(Y). Assuming there are N different wavelengths that may be received from a transmit bank 302, the filter bank 304 may include N optical ring filters 310, each of which may be tuned to a respective one of the N wavelengths. In particular, each optical ring filter 310 is sensitive to a specific wavelength (i.e., its resonance wavelength), and is configured to route optical signals having that specific wavelength to a predetermined output port of the filter bank 304 that is physically connected to an optical fiber that is, in turn, connected to a particular receive bank of one or more receive banks 306(1)-306(M), as determined based on system design. The receive banks 306(1)-306(M) are generically referred to herein as receive bank 306. It should be appreciated that Y and M may represent the same integer or different integers.

More specifically, optical signals of a specific wavelength that matches the resonance wavelength of a particular optical ring filter 310 are routed to a specific output fiber of the filter bank 304 that is predetermined based on system design. This specific output fiber, in turn, leads to a particular receive bank 306, which is also predetermined based on system design as well as the actual physical fiber connections that exist between nodes. Each receive bank 306 may include multiple optical ring filters 314 as well. Accordingly, when a particular receive bank 306 receives, on an input fiber, an optical signal of a given wavelength, a respective one of the multiple optical ring filters 314 may detect the wavelength and a photodetector corresponding to the optical ring filter 314 may convert the optical signal into an electrical signal.

As a specific, non-limiting example, consider transmit bank 302(1). Optical ring modulator Tx Ring 1 may encode data onto wavelength 1. The encoded data on wavelength 1 may be routed via optical fiber 312 into the filter bank 304. An appropriate optical ring filter 310 of filter bank 304 may then align to this wavelength (i.e., tune its resonance wavelength to wavelength 1) and route the wavelength 1 encoded data received on fiber 312 to an output port having a predetermined association with that ring filter. The output port may be connected to an optical fiber 314 to leads into receive bank 306(1). If, however, the intended destination endpoint for optical signals received on optical fiber 312 and having wavelength 1 is another receive bank instead (e.g., receive bank 306(M)), then a different optical ring filter 310 needs to be employed. In particular, an optical ring filter 310 that has a predetermined association with an output port of the filter bank 304 that is, in turn, connected to receive bank 306(M) via a corresponding optical fiber needs to be tuned to wavelength 1 so that optical signals received on input fiber 312 and having wavelength 1 are routed to the appropriate output port/optical fiber/receive bank. As such, the filter bank 304 needs to generate a wavelength routing map with respect to each input fiber, or alternatively, a wavelength routing map with respect to each transmit bank 302 in the case of multiple input fibers coming into the filter bank 304 from the transmit bank 302. Each wavelength routing map associates transmit wavelengths received on a given input fiber (or from a given transmit bank 302) to respective optical ring filters 310 of the filter bank 304, which in turn, associates the wavelengths with respective intended destination receive banks 306, based on predetermined associations between optical ring filters 310 of the filter bank 304 and output fibers of the filter bank 304 that lead to the receive banks 306. Embodiments of the disclosed technology provide link training algorithms that a controller of the filter bank 304 (e.g., a control application specific integrated circuit (ASIC)) can execute to create such wavelength routing maps.

Assuming, for example, that receive bank 306(1) is the intended destination endpoint for optical signals of wavelength 1 that are received on fiber 310 from transmit bank 302(1), then an Rx ring of the receive bank 306(1) (or more particularly, an associated photodetector) may convert the optical signals to electrical signals. It should be appreciated that this need not be Rx ring 1 of receive bank 306(1), but can be any Rx ring within the receive bank 306(1), as determined based on serialization/de-serialization and the encoded communication protocol. That is, a spatial ordering of Tx rings that transmit light at respective resonance wavelengths having a particular spectral order may not match up with a spatial ordering of Rx rings that are tuned to are tuned to the respective resonance wavelengths.

Example embodiments of the disclosed technology described herein, including the embodiment of FIG. 3, assume a symmetric number of input and output fibers. This, however, is not necessarily the case. For example, the filter bank 304 may have different numbers of input and output fibers. More specifically, the number of fiber inputs, outputs, and wavelengths per input and output fiber depend on the particular system implementation. As a non-limiting example, there may be a respective single input fiber to the filter bank 304 from each transmit bank 302 and a respective single output fiber to each receive bank 306, but the number of transmit banks 302(1)-302(Y) may differ from the number of receive banks 306(1)-306(M), thereby resulting in different numbers of input and output fibers for the filter bank 304. Alternatively, in some embodiments, there may be multiple input fibers coming into the filter bank 304 from a single transmit bank 302 and/or multiple output fibers of the filter bank 304 that lead into a single receive bank 306, in which case, the numbers of input and output fibers may differ despite the number of transmit banks 302 and the number of receive banks 306 potentially being the same. It should also be appreciated that any given receive bank 306 may receive additional optical inputs routed to it from other filter banks and along other input fibers not explicitly shown in FIG. 3.

Figure 5A:
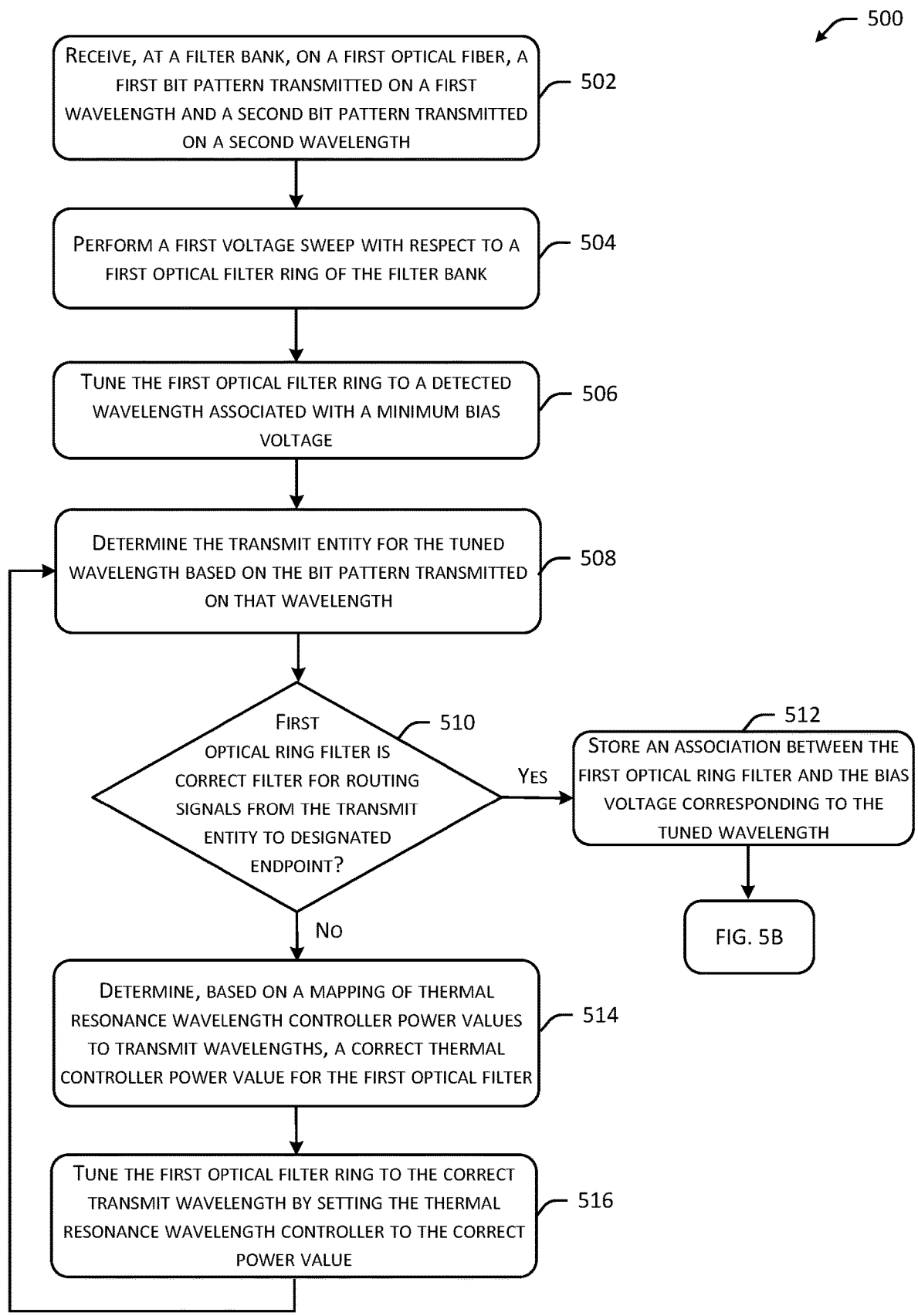
FIGS. 5A and 5B are flowcharts depicting an illustrative method for performing OPT link training according to example embodiments of the disclosed technology.
Figure 5B:
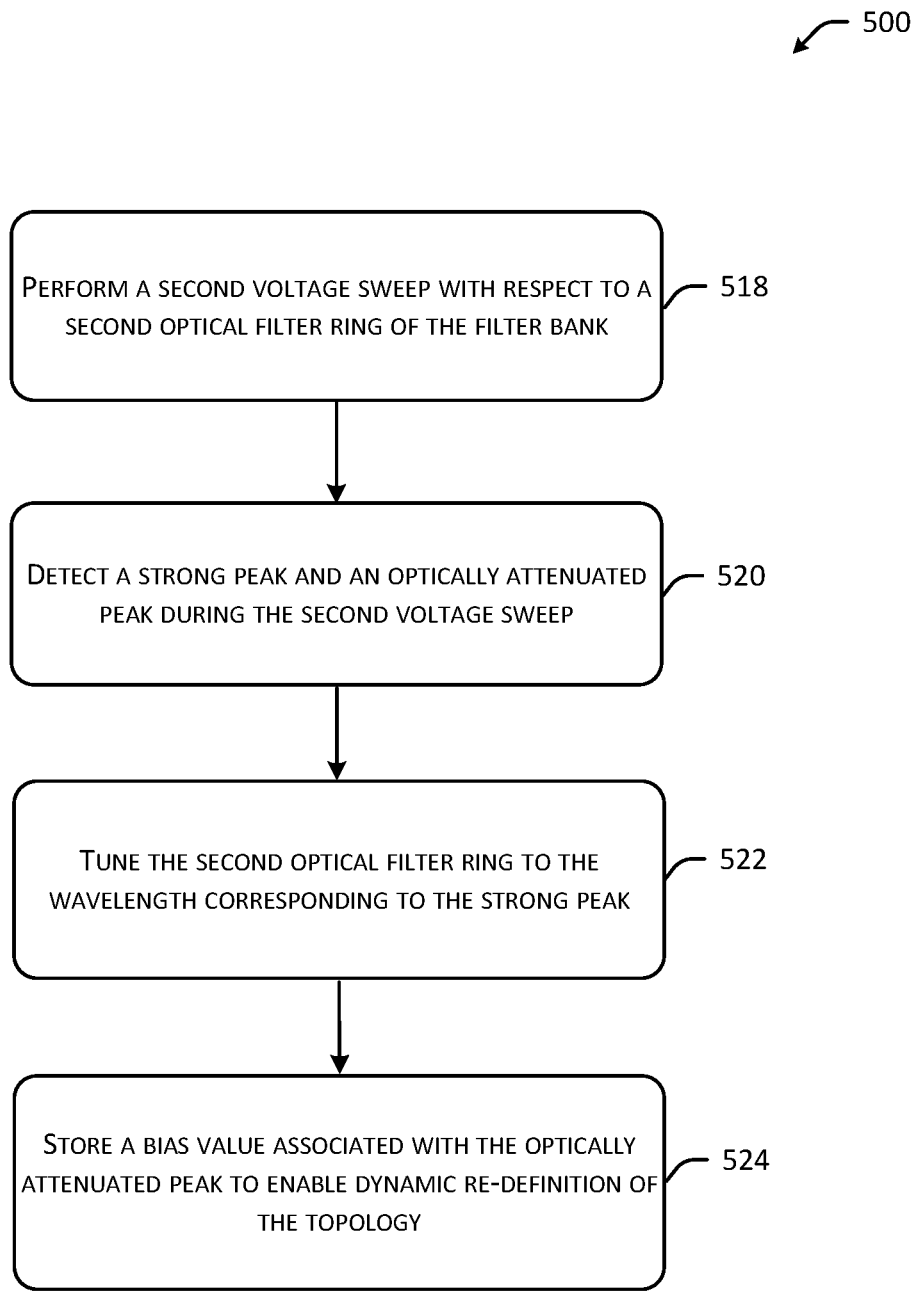

FIGS. 5A and 5B are flowcharts depicting an illustrative method 500 for performing OPT link training according to example embodiments of the disclosed technology. The method 500 will be described hereinafter with reference to an illustrative example involving the DWDM optical interconnect architecture of FIG. 3. In this example, it is assumed that the filter bank 304 receives both optical signals at wavelength 1 and optical signals at wavelength 2 on fiber 312 from transmit bank 302(1). It is further assumed that transmit bank 302(1) desires to have wavelength 1 routed to receive bank 306(1) and wavelength 2 routed to receive bank 306(2). It is still further assumed that, as a result of the design of the photonic circuit of the filter bank 304, that ring filter 1 routes its resonance wavelength on the output fiber 314 leading to receive bank 306(1), and that ring filter 2 routes its resonance wavelength to an output fiber (not depicted in FIG. 3) that leads to receive bank 306(2). It should be appreciated, however, that the method 300 is not limited to this particular example, and can be extrapolated to generating wavelength routing maps for any number of input/output fibers and any number of wavelengths per input/output fiber.

Referring now to FIG. 5A in conjunction with the non-limiting example introduced above, at block 502 of the method 500, the filter bank 304 receives on optical fiber 312 from transmit bank 302(1), a first bit pattern transmitted on wavelength 1 and a second bit pattern transmitted on wavelength 2. More specifically, each Tx ring of transmit bank 302(1) may broadcast a self-identifying bit pattern. The bit pattern may identify the name of the transmitting entity, the transmit link, and the transmit lane buffer, for example. For instance, in an N-node network topology, the entity name may be "Node 0010" for the 3rd node in the system. Further, assuming, for example, that each node has 16 PCIe x8 links, the link name may be "link 0011" for the 4th link of 16. In addition, for the transmit lane component of the bit pattern, "lane 0100" may identify the $5^{th}$ lane, for example. As such, an encoded bit pattern of "0010 0011 0100" may identify the transmitting entity as the third node, the transmit link as the fourth link, and the transmit lane as the fifth lane. In practice, the bit pattern may be encoded between preamble bits that enable the receive circuitry to determine when the pattern of interest actually begins.

In some embodiments, all wavelengths transmitted on input fiber 312 identify themselves in this manner. In the current example, we are assuming two wavelengths are transmitted on fiber 312, in which case, the filter bank 304 will receive, at block 502, two unique bit patterns on two distinct wavelengths. In some embodiments, each optical ring 310 of the filter bank 304 may have a thermal resonance wavelength controller associated (e.g., integrated) therewith. Each such thermal resonance wavelength controller may be configured to tune the resonance wavelength of a corresponding optical ring filter 310. For ease of explanation, a thermal resonance wavelength controller will be referred to herein as a "heater."

Referring again to FIG. 5A, at block 504 of the method 500, an OPT controller of the filter bank 304 (e.g., a control ASIC) may perform a first voltage sweep with respect to a first optical filter of the filter bank 304 (e.g., ring filter 1). More specifically, the control ASIC of the filter bank 304 may sweep ring filter 1's heater from a minimum voltage of the heater to a maximum voltage of the heater. This may result in a one full free-spectral range (FSR) of tuning. Then, at block 506, the OPT training algorithm causes ring filter 1 to be tuned to the detected wavelength that corresponds to the minimum bias voltage registered by the heater, which may be either one of wavelength 1 or wavelength 2. In particular, in some embodiments, the OPT training algorithm may aim to minimize power consumption, in which case, it seeks to "lock" each ring filter to a detected wavelength (among one or more detected wavelengths) that is associated with a minimum bias voltage. More specifically, assuming that in this example ring filter 1 is physically located closer to the input port of the bus waveguide, as the heater associated with ring filter 1 is swept across its FSR, it will detect two wavelengths, i.e., wavelength 1 and wavelength 2. In accordance with the OPT training algorithm, the resonance wavelength of ring filter 1 is tuned to the detected wavelength that corresponds to the lower bias voltage registered for the heater, which, spectrally, may be either one of wavelength 1 or wavelength 2, since the ring filters are agnostic as to the actual wavelength value, i.e., "color."

Once ring filter 1 is "locked" to the detected wavelength having the lower bias voltage, the control ASIC of the filter bank 304 will determine which of the two wavelengths—wavelength 1 or wavelength 2—that ring filter 1's resonance wavelength is tuned to. More specifically, at block 508 of the method 500, the control ASIC may determine the transmit entity that corresponds to the tuned wavelength based on the bit pattern that was transmitted on that wavelength. In particular, the control ASIC may consult a look-up table or other mapping that associates transmit entities (or more specifically, bit patterns that uniquely identify transmit entities) to intended destination endpoints to determine a particular intended destination endpoint for optical signals having the tuned wavelength that are received from the transmit entity identified by the bit pattern. As previously noted, each Tx ring of a transmit bank 302 may transmit a self-identifying bit pattern. Further, each Tx ring may transmit optical signals, including the self-identifying bit pattern, at a different, specific wavelength. Accordingly, the bit pattern transmitted on the wavelength to which ring filter 1 has been tuned may uniquely identify a corresponding Tx ring of transmit bank 302(1), and the particular destination endpoint associated with that bit pattern in the look-up table may represent the intended receive bank for receiving optical signals from that particular Tx ring, which as noted earlier, are transmitted on the wavelength that ring filter 1 has been locked onto.

At block 510 of the method 500, the control ASIC of the filter bank 304 determines whether ring filter 1 is the appropriate ring filter for routing optical signals having the tuned wavelength, and which are received from transmit bank 1 on fiber 312. More specifically, the control ASIC may determine whether the receive bank (e.g., receive bank 306(1)) that is connected to the output port/fiber to which ring filter 1 routes its resonance wavelength is the same as the intended destination endpoint that is linked, in the look-up table, to the bit pattern that was received on that wavelength. In response to a positive determination at block 510, the method 500 may proceed to block 512, where an association is stored between ring filter 1 and the bias voltage that corresponds to the detected wavelength to which ring filter 1's resonance wavelength has been tuned. This association may be stored as part of a wavelength routing map. Then, the method 500 may proceed to block 518 (FIG. 5B), where the OPT training algorithm may begin tuning ring filter 2 to a detected wavelength, which will be described in more detail later in this disclosure. While a wavelength routing map has been described at times herein as associating transmit wavelengths with intended destination endpoints, in some embodiments, a wavelength routing map may actually store associations between identifiers of destination endpoints and heater bias voltages that correspond to various transmit wavelengths.

If, on the other hand, a negative determination is made at block 510 indicating that the predefined destination for optical signals routed by ring filter 1 (i.e., receive bank 306(1)) is not a correct intended destination for optical signals that are received from transmit bank 302(1) at the wavelength to which ring filter 1 is tuned (which in this example means that ring filter 1 has been incorrectly tuned to wavelength 2), then the method 500 may proceed to block 514. At block 514, the control ASIC of filter bank 304 may determine a correct power value for a thermal resonance wavelength controller associated with ring filter 1. More specifically, the control ASIC may access a stored mapping of heater power values to heater bias voltages corresponding to transmit wavelengths and may determine the correct heat power value from the stored mapping. Then, at block 516 of the method 500, ring filter 1 may be detuned from the "wrong" wavelength (in this example, wavelength 2) and may be tuned to the correct wavelength (in this example, wavelength 1) by setting the heater associated with ring filter 1 to the ascertained correct heater power value. In some embodiments, each ring filter may generate the above-described stored mapping by initially calibrating its heater power values with respect to transmit wavelengths it is able to detect. Each ring filter may do this so that it is able to know which heater power value it must set the thermal wavelength resonance controller to in order to send a particular wavelength that it cannot "see" to a destination to which it is physically connected.

In addition, in some embodiments, if ring filter 1 initially tunes itself to the "wrong wavelength," i.e., wavelength 2, various additional actions can be taken. For instance, by maintaining ring filter 1 on wavelength 2 and tuning ring filter 2 onto the same wavelength, a sort of "hand-off" of wavelength 1 can occur from ring filter 1 onto ring filter 2. By storing the bias voltage corresponding to wavelength 1 such that it can be accessed by ring filter 2, optical signals at wavelength 1 can be broadcasted at a later time to two different endpoints physically connected to ring filter 1 and ring filter 2, respectively. More specifically, ring filter 1 will be able to broadcast wavelength 1 once it detunes from incorrect wavelength 2 and tunes to correct wavelength 1. But, ring filter 2 may also be able to broadcast wavelength 1 to a physically connected endpoint by virtue of having stored the bias voltage corresponding to wavelength 1, despite ring filter 2 being tuned to wavelength 2. This type of wavelength hand-off scenario can also be used to modify/create a network topology map. FIG. 5B depicts another scenario in which a network topology can be dynamically redefined based on stored bias values without having to recreate an entire new network topology map.

Referring now to FIG. 5B, assuming that ring filter 1 is successfully tuned to the "correct" wavelength (in this example, wavelength 1), the OPT training algorithm may proceed to block 518, where the control ASIC of the filter bank 304 may perform a voltage sweep with respect to ring filter 2. More specifically, the control ASIC may perform a full-spectral sweep of the thermal wavelength resonance controller (heater) corresponding to ring filter 2.

Assuming that ring filter 1 has been successfully tuned to wavelength 1, during the voltage sweep of the heater associated with ring filter 2, two voltage/power peaks may be observed at block 520. In particular, ring filter 2 may observe a strong peak that corresponds to wavelength 2 (which travels along the bus waveguide past ring filter 1 and reaches ring filter 2) and an optically attenuated peak. The optically attenuated peak may correspond to wavelength 1 and may result from signal leakage out of ring filter 1 onto the bus waveguide. The OPT training algorithm may use the information of this optically attenuated peak for ancillary wavelength mapping, as discussed in more detail below.

In particular, at block 522 of the method 500, ring filter 2 may be tuned to the wavelength that corresponds to the observed strong peak. In this example, this is wavelength 2. Then, at block 524 of the method 500, in order to enable ancillary wavelength mapping, ring filter 2 may store a bias value (e.g., a bias voltage) corresponding to the optically attenuated peak that was observed. This stored value allows ring filter 2 to dynamically redefine the network topology by modifying a wavelength routing map to associate ring filter 2 with the wavelength corresponding to the stored bias value representative of the optically attenuated peak if, for example, transmit bank 302(1) modifies the intended destination for wavelength 1 from receive bank 306(1) to receive bank 306(2).

Figure 4:
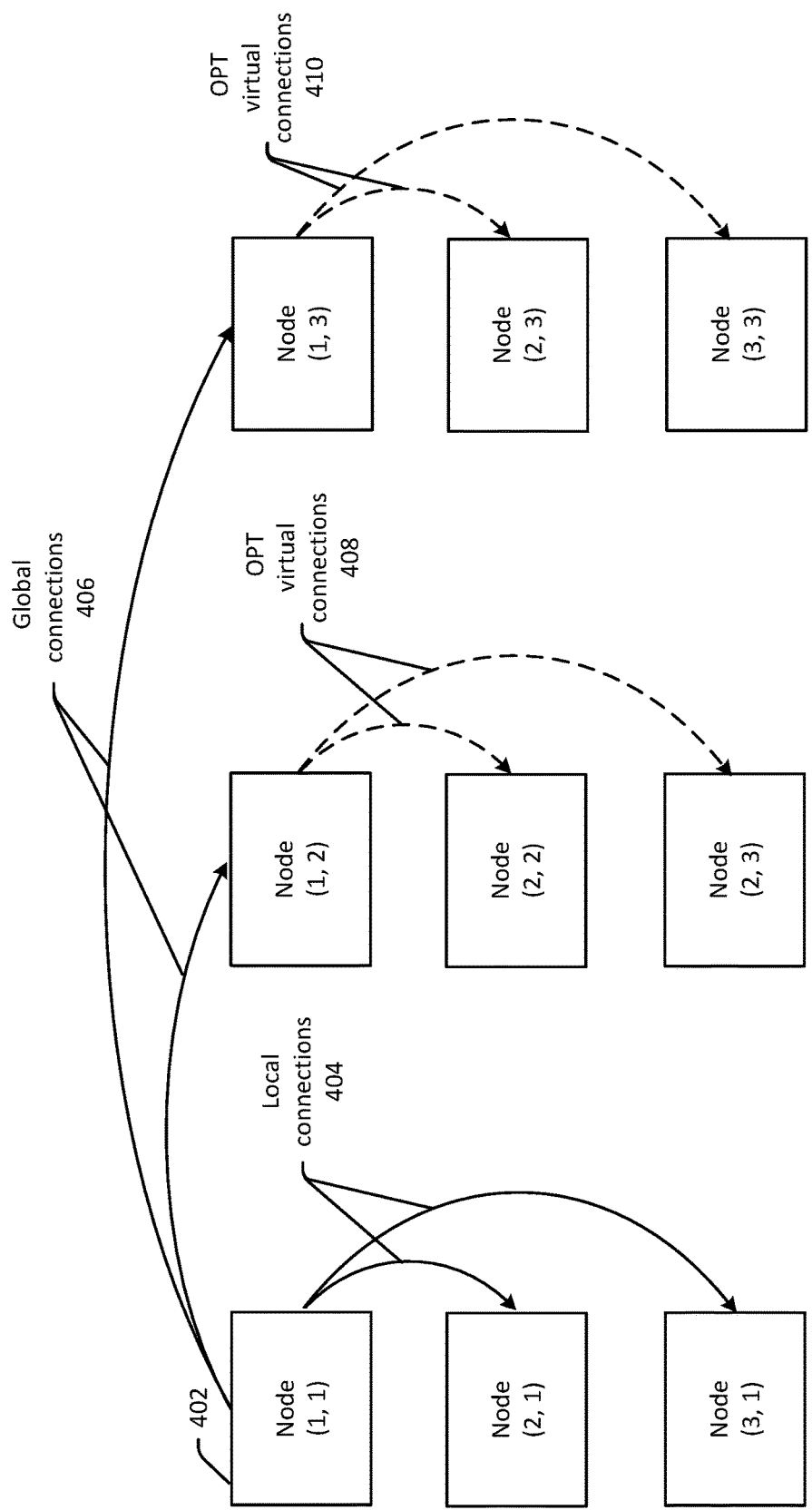
FIG. 4 is a schematic diagram of a network topology configured to provide OPT capabilities according to example embodiments of the disclosed technology.

FIG. 4 schematically depicts an example network topology configured to provide OPT capabilities according to example embodiments of the disclosed technology. More specifically, the OPT training algorithm of FIGS. 5A and 5B may be executed to provide the various interconnected nodes of the network topology with OPT capabilities that enable transparent on-chip wavelength routing for multi-wavelength inputs.

In the example network topology of FIG. 4, each node 402 may include a transmit bank 302, a filter bank 304, and a receive bank 306. When viewing the topology from the perspective of node (1, 1), for example, four physical fiber connections are present between node (1, 1) and other nodes 402 of the network topology. These connections include two global connections 406 to node (1, 2) and node (1, 3), respectively, and two local connections 404 to node (2, 1) and node (3, 1), respectively. Moreover, optical fibers that physically connect the filter banks of various intermediate nodes to the receive banks of various destination nodes are represented in dashed lines. For example, intermediate node (1, 2) may have respective fiber output connections to node (2, 2) and node (2, 3). Similarly, intermediate node (1, 3) may have respective fiber output connections to node (2, 3) and node (3, 3). The OPT capabilities of intermediate nodes (1, 2) and (1, 3) may enable node (1, 1) to establish "virtual" connections 408, 410 to these additional nodes in the topology despite not having direct physical connections to these additional nodes.

For example, if node (1, 1) intends to communicate with node (2, 2), it can do so by leveraging intermediate node (1, 2) and the OPT capabilities of node (1, 2). By encoding wavelength N on its output fiber to node (2, 2), node (1, 2) will be able to transparently route the incoming wavelength N on the fiber from node (1, 1) to its intended destination, i.e., node (2, 2). That is, node (1, 2) will align the correct ring filter (the one having a predetermined association with the output fiber to node (2, 2)) to the fiber input from node (1, 1) having wavelength N such that wavelength N received from node (1, 1) is appropriately routed to node (2,2). In some embodiments, the receive banks of node (2, 2) will also generate and maintain a wavelength routing map that identifies wavelength N on the input fiber from Node (1, 2) as carrying information from node (1,1), which is different from other wavelengths and fibers that carry information from other nodes.

Figure 6:
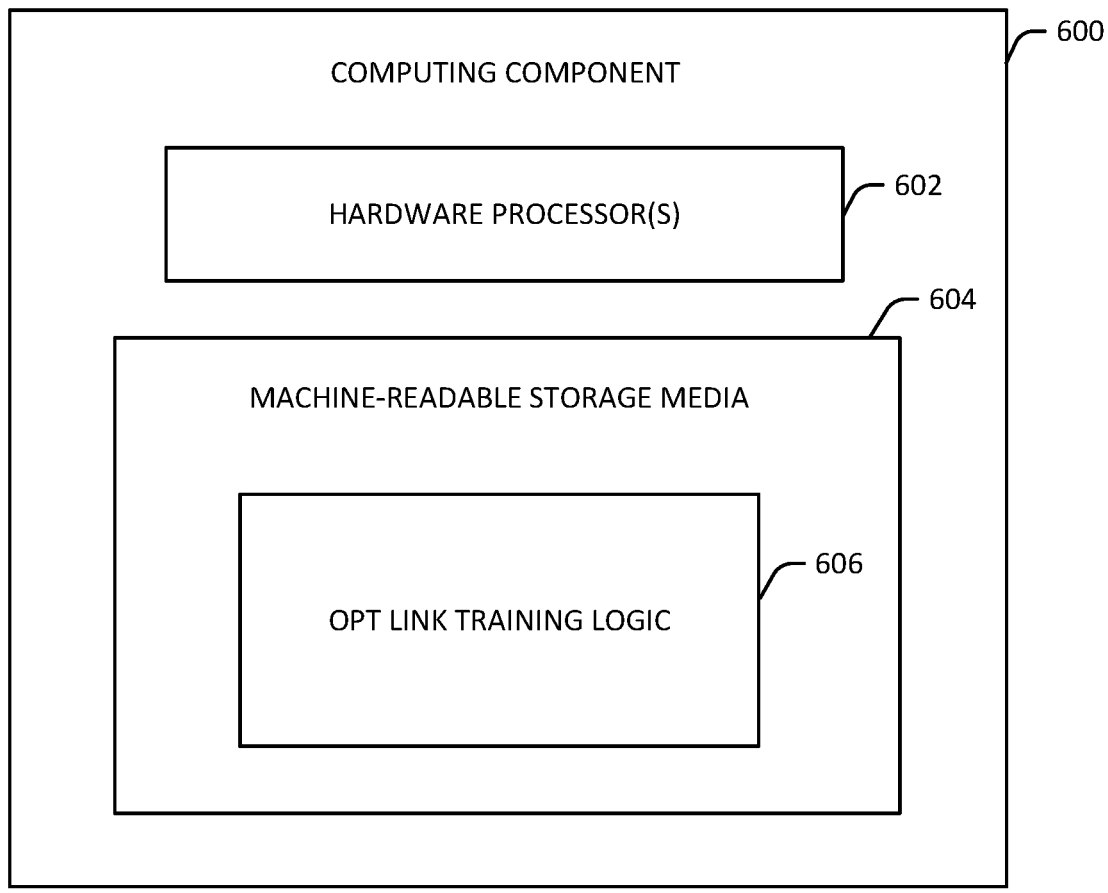
FIG. 6 depicts a set of executable logic stored in machine-readable storage media that, when executed, causes the method of FIGS. 5A and 5B to be performed according to example embodiments of the disclosed technology.

FIG. 6 depicts executable logic stored in machine-readable storage media that, when executed, causes the illustrative method of FIGS. 5A and 5B to be performed. FIG. 6 depicts a computing component 600 that includes one or more hardware processors 602 and machine-readable storage media 604 storing OPT link training logic 606. The logic 606 may include a set of machine-readable/machine-executable instructions. While the hardware processors 602 may be referred to herein in the singular form or the plural form, in either case, it is intended to convey that one or more hardware processors may be provided. The computing component 600 may be, for example, the computing system 700 depicted in FIG. 7. In some embodiments, the computing component 600 is a network device such as a client device, an access point, a router, or the like. In other example embodiments, the computing components 600 is a server, a server cluster, or the like. The hardware processors 602 may include, for example, the processor(s) 704 depicted in FIG. 7 or any other processing unit described herein. The machine-readable storage media 604 may include the main memory 706, the read-only memory (ROM) 708, the storage 710, or any other suitable machine-readable storage media described herein.

In some embodiments, the instructions embodied in the logic 606 stored on the machine-readable storage media 604 may be modularized into one or more computing engines/program modules. In particular, each such computing engine may include a set of machine-readable and machine-executable instructions, that when executed by a hardware processor 602, causes the hardware processor 602 to perform corresponding tasks/processing. In some embodiments, the set of tasks performed responsive to execution of the set of instructions forming a particular computing engine may be a set of specialized/customized tasks for effectuating a particular type/scope of processing. The aforementioned engines/program modules can be implemented in any combination of hardware, software, and/or firmware. In some embodiments, these engines may be customized computer-executable logic implemented within a customized computing machine such as a customized field programmable gate array (FPGA) or an application specific integrated circuit (ASIC).

Figure 7:
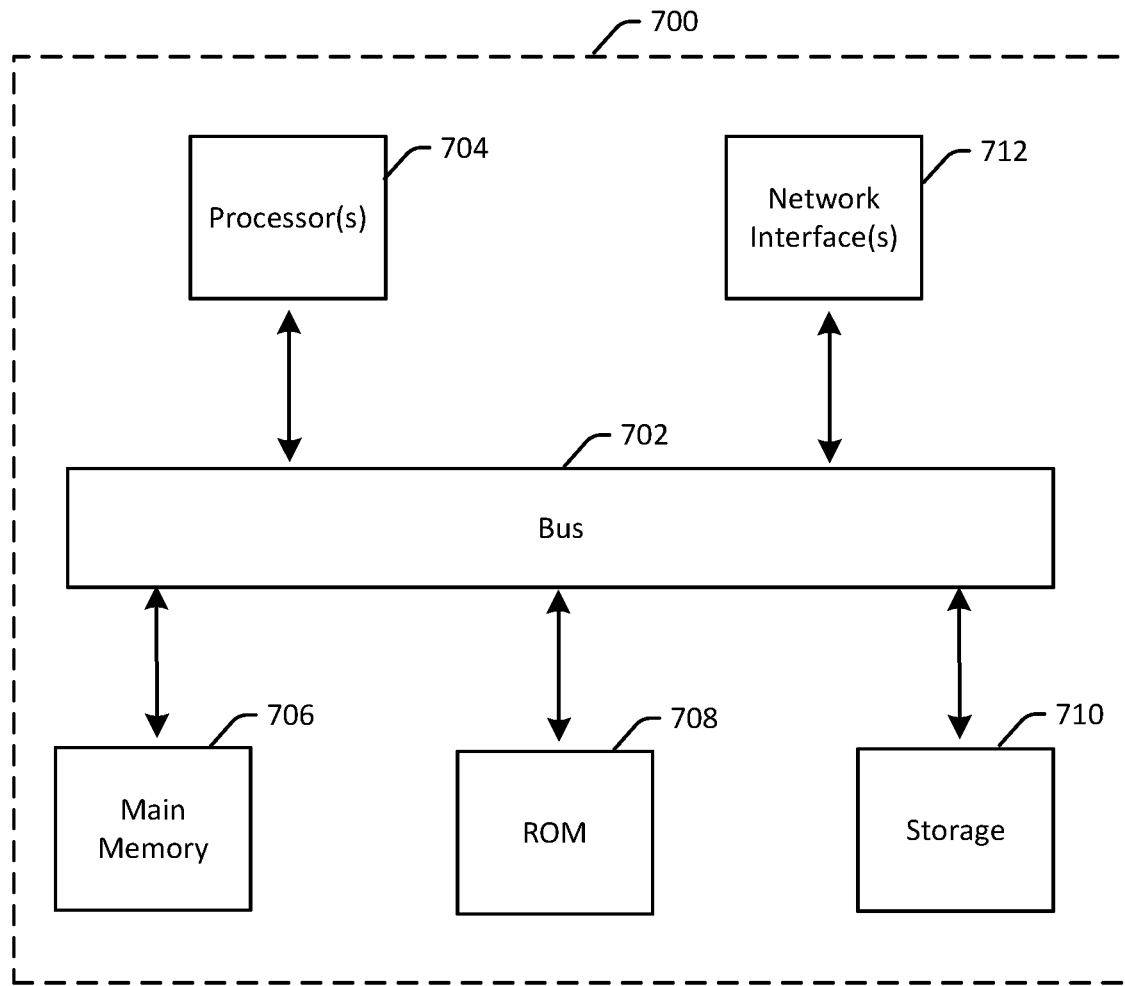
FIG. 7 is an example computing component that may be used to implement various features of example embodiments of the disclosed technology.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718. The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for optical pass-through (OPT) link training, the method comprising:
   receiving, at a first optical ring filter, from a transmit node, a first bit pattern transmitted on a first wavelength and a second bit pattern transmitted on a second wavelength;
   detecting, at the first optical ring filter, each of the first and second wavelengths based on corresponding bias voltages registered by an integrated thermal resonance wavelength controller of the first optical ring filter;
   tuning a resonance wavelength of the first optical ring filter to a detected wavelength associated with a lower bias voltage, the detected wavelength being one of the first wavelength or the second wavelength;
   determining whether a first receive node connected to the first optical ring filter matches an intended destination endpoint for signals received from the transmit node at the tuned resonance wavelength; and
   generating a wavelength routing map based at least in part upon whether the first received node matches the intended destination endpoint.

2. The method of claim 1, wherein the first receive node is connected to a first output port of a filter node containing the first optical ring filter, and wherein the first optical ring filter is configured to route the resonance wavelength to the first receive node via the first output port.

3. The method of claim 1, wherein determining whether the first receive node matches the intended destination endpoint comprises: identifying one of the first bit pattern or the second bit pattern as being received on the tuned resonance wavelength;
   identifying a particular transmit entity from the identified bit pattern;
   accessing a stored mapping of transmit entities to destination endpoints to determine a particular destination endpoint corresponding to the particular transmit entity;
   determining that the particular destination endpoint is the first receive node; and
   determining that the first receive node matches the intended destination endpoint based on the particular destination endpoint being the first receive node.

4. The method of claim 3, wherein generating the wavelength routing map comprises mapping the first optical ring filter to a bias voltage that corresponds to the tuned resonance wavelength of the first optical ring filter.

5. The method of claim 1, wherein detecting, at the first optical ring filter, each of the first and second wavelengths comprises detecting each of the first and second wavelengths during a voltage sweep of the integrated thermal resonance wavelength controller from a minimum voltage to a maximum voltage.

6. The method of claim 1, wherein upon determination that the first receive node matches the intended destination endpoint, the method further comprises:
   detecting, at a second optical ring filter, a first signal speak and a second signal peak;
   determining that the first signal peak is optically attenuated in relation to the second signal peak; and
   tuning a resonance wavelength of the second optical ring filter to a wavelength corresponding to the second signal peak.

7. The method of claim 6, further comprising:
   determining, based at least in part on the first signal peak being optically attenuated in relation to the second signal peak, that the first signal peak corresponds to the tuned resonance wavelength of the first optical ring filter; and
   storing an association between the first transmit node and a bias voltage corresponding to the first signal peak.

8. The method of claim 7, wherein the stored association between the first transmit node and the bias voltage corresponding to the first signal peak enables the second optical filter to dynamically redefine a network topology without recreating the wavelength routing map.

9. The method of claim 8, wherein the intended destination endpoint is a first intended destination endpoint, the method further comprising:
- determining that the first intended destination endpoint for signals received from the transmit node at the tuned resonance wavelength of the first optical ring filter has changed to a second intended destination endpoint;
- determining that the second intended destination endpoint is a second receive node connected to a second output port of the second optical ring filter to which the tuned resonance wavelength of the second optical ring filter is routed; and
- modifying the wavelength routing map to change an association of the second optical ring filter from a bias voltage corresponding to the second signal peak to the bias voltage corresponding to the first signal peak.

10. The method of claim 6, wherein a second output port of the second optical ring filter to which the tuned resonance wavelength of the second optical ring filter is routed is connected to a second receive node different from the first receive node.

11. The method of claim 1, wherein each of the first and second wavelengths is a resonance wavelength of a respective optical ring filter of the transmit node.

12. The method of claim 1, wherein determining whether first receive node matches the intended destination endpoint comprises:
- identifying one of the first bit pattern or the second bit pattern as being received on the tuned resonance wavelength;
- identifying a particular transmit entity from the identified bit pattern;
- accessing a stored mapping of transmit entities to destination endpoints to determine a particular destination endpoint corresponding to the particular transmit entity;
- determining that the particular destination endpoint is not the first receive node; and
- determining that the first receive node does not match the intended destination endpoint based on the particular destination endpoint not being the first receive node.

13. The method of claim 12, wherein the tuned resonance wavelength of the first optical ring filter is the first wavelength, the method further comprising:
- de-tuning the first optical ring filter from the first wavelength;
- determining, based at least in part on a stored mapping of integrated thermal resonance wavelength controller power values to transmit wavelengths, a particular power value corresponding to the second wavelength; and
- tuning the first optical ring filter to the second wavelength at least in part by setting the integrated thermal resonance wavelength controller to the particular power value.

14. The method of claim 1, wherein the first receive node matches the intended destination endpoint, the method further comprising:
- receiving an optical signal having a particular wavelength;
- determining that the particular wavelength matches the tuned resonance wavelength of the first optical ring filter;
- routing the optical signal to a first output port of a filter node containing the first optical ring filter based on the particular wavelength matching the tuned resonance wavelength of the first optical ring filter and based on a predefined association between the first optical ring filter and the first output port; and
- sending the optical signal to the first receive node, wherein the first receiving node is connected to the first output port.

15. The method of claim 14, wherein a particular optical ring filter of the first receive node is configured to convert the received optical signal to an electrical signal.

* * * * *